US008038081B2

(12) United States Patent
Hendy

(10) Patent No.: US 8,038,081 B2
(45) Date of Patent: Oct. 18, 2011

(54) MOBILE POWER WASHER

(75) Inventor: Robert John Hendy, Milverton (GB)

(73) Assignee: Brendon Limited, Wiveliscombe, Taunton (GB)

( * ) Notice: Subject to any disclaimer, the term of this patent is extended or adjusted under 35 U.S.C. 154(b) by 135 days.

(21) Appl. No.: 12/540,389

(22) Filed: Aug. 13, 2009

(65) Prior Publication Data

US 2011/0036418 A1 Feb. 17, 2011

(51) Int. Cl.
*A01G 25/09* (2006.01)
*B05B 9/00* (2006.01)

(52) U.S. Cl. ..... 239/172; 239/127; 239/128; 239/132.1; 239/129

(58) Field of Classification Search .................. 239/124, 239/126, 127, 128, 135, 146, 147, 172; 165/210, 165/137, 66, 108
See application file for complete search history.

(56) References Cited

U.S. PATENT DOCUMENTS

| | | | | | |
|---|---|---|---|---|---|
| 3,814,321 | A * | 6/1974 | Mulholland et al. | 239/135 |
| 3,997,114 | A * | 12/1976 | Hewett | 239/127 |
| 4,215,741 | A * | 8/1980 | Averbuch et al. | 165/11.1 |
| 4,550,773 | A * | 11/1985 | Martin | 165/54 |
| 4,869,232 | A * | 9/1989 | Narang | 122/14.1 |
| 5,143,149 | A * | 9/1992 | Kronberg | 165/300 |
| 5,282,590 | A * | 2/1994 | Zwick | 244/134 C |
| 5,366,154 | A * | 11/1994 | Thompson | 239/13 |
| 6,082,630 | A * | 7/2000 | Bohrer | 239/127 |
| 6,164,557 | A * | 12/2000 | Larson | 239/75 |
| 6,435,424 | B1 * | 8/2002 | Pauley et al. | 239/128 |
| 2005/0258269 | A1 * | 11/2005 | Schmidt | 239/124 |
| 2008/0041465 | A1 * | 2/2008 | Kimura | 137/587 |

FOREIGN PATENT DOCUMENTS

| | | | |
|---|---|---|---|
| EP | 1746360 | A1 | 1/2007 |
| WO | 2008/068490 | A1 | 6/2008 |
| WO | 2008/068490 | A1 | 12/2008 |

OTHER PUBLICATIONS

International Search Report for PCT/GB2010/051330 dated Nov. 22, 2010.

* cited by examiner

*Primary Examiner* — Dinh Nguyen
*Assistant Examiner* — Jennifer Gordon
(74) *Attorney, Agent, or Firm* — MacMillan, Sobanski & Todd, LLC

(57) ABSTRACT

A mobile power washer includes a heater module that is displaceable from an operative position, beneath a vented panel, to an access position enabling easy servicing or replacement of the module. The module includes a heater and a heat exchanger for heating water drawn from tanks for delivery at high pressure through a spray gun attached to a hose. A buffer tank is provided for retaining water heated by the heater for mixing with cold water from the tanks prior to further heating in the heat exchanger and delivery from the spray gun.

19 Claims, 2 Drawing Sheets

Fig 1

MOBILE POWER WASHER

BACKGROUND OF THE INVENTION

This invention relates to a mobile power washer for supplying pressurized hot water.

It is known to provide a high pressure power washer mounted on a trailer. A typical trailer mounted power washer may be powered by a petrol or diesel engine and be capable of delivering water supplied from a water tank through a hand held gun at a pressure of between 120 and 250 bar, and at a flow rate of between 12 and 18 liters per minute. Generally, the water supplied is untreated and therefore at ambient temperature, for example between 2° C. and 10° C.

However, hot water is sometimes required. For example, hot water is used on building sites for defrosting metal reinforcements prior to concreting and for cleaning tasks. Hot water is also required by the military, for example, for showering of soldiers in remote locations and for decontamination. There is therefore a need to provide a high pressure power washer capable of delivering hot water.

One known method of providing hot water on location is to fill the water tank of an existing trailer mounted power washer with hot water. However, this is generally inconvenient, because there may be no adequate source of hot water available, and the hot water, once in the tank of the power washer, may cool before use, particularly if the hot water source is some distance from the location where the hot water is required. Furthermore, the seals in existing washers are typically designed for use with cold water, and so may not be able to cope with hot water, for example, in excess of 50° C., and leaks may occur.

Alternatively, it is known to provide a machine providing high pressure hot water by passing a high pressure cold flow directly through a heated coil. However, machines of this type are typically large and heavy and are not particularly suitable for trailer mounting. They also require regular servicing and have a relatively short life expectancy.

WO2008/068490 discloses a trailer mounted power washer including an oil fired heater which heats a working fluid. Washing water passes through a heat exchanger where it is heated by the working fluid as the water passes from a tank to a pump and a delivery device such as a spray gun. When delivery of water is stopped, water flows through a bypass loop which incorporates a cooler to avoid friction induced overheating of the recirculating flow. A disadvantage of the power washer of WO2008/068490 is that there is a significant loss of heat from the bypass loop which cannot be recovered when delivery of water starts again.

SUMMARY OF THE INVENTION

According to the present invention, there is provided a mobile power washer comprising a wheeled trailer carrying: a water supply system including a water supply tank, a delivery device and a pump means for supplying water from the water supply tank to the delivery device; a heating system comprising a fluid circuit including a fuel fired heater for heating fluid in the fluid circuit; and a heat exchanger for providing heat exchange between heated fluid in the fluid circuit and water in the water supply system, wherein the water supply system includes a buffer tank connected to receive water from a first point in the water supply system situated downstream of the heat exchanger and the pump means and upstream of the delivery device, and connected to deliver water to a second point in the water supply system situated between the water supply tank and the pump means.

In this specification, references to "upstream" and "downstream" refer to the respective flow directions in normal operation of the power washer.

When the heating system is operative, water from the water supply tank passes through the heat exchanger and is heated on demand. If the delivery device is closed while the heating system is operative, heated water is diverted at the first point into the buffer tank and then recirculated from the buffer tank to the pump and the heat exchanger. If the heating system is not running, the fluid in the fluid circuit is not heated and so the water from the water supply tank is pumped cold, i.e. at ambient temperature, to the delivery device.

The pump means may comprise a high pressure pump, i.e. a pump capable of delivering water to the delivery device at a pressure of at least 100 bar. The heat exchanger may be positioned on the low-pressure side, i.e. upstream, of the pressure pump so as to avoid subjecting the heat exchanger to the high pressure of the water delivered by the pump. The pump means may also comprise a supplementary booster pump provided upstream of the heat exchanger in order to maintain pressure at the water inlet of the heat exchanger.

The high pressure pump may have a capacity sufficient to provide a water pressure at the delivery device of between 100 and 340 bar. A pressure regulator may be provided at the delivery device to control a desired maximum delivery pressure. The pressure regulator may be provided at the first point in the water supply system, and may serve to divert water from the delivery device to the buffer tank.

A mixer valve may be provided at the second point in the water supply system. The mixer valve may have a first inlet communicating with the water supply tank, a second inlet communicating with the buffer tank, and an outlet communicating with the delivery device via the heat exchanger and the pump means.

The heat exchanger may be a counter-flow plate heat exchanger.

The heating system and the heat exchanger may comprise a module mounted on a sub-frame which may be slidably mounted on a main frame of the trailer for movement between an operative position and an access position. This enables the heating system and the heat exchanger to be easily accessed for servicing, and to be removed and replaced.

The water supply tank may comprise a plurality of containers which communicate with one another. In one embodiment, two containers of the water supply tank may be spaced apart from each other, for example at opposite sides of the trailer, to define an accommodation space between them. The heating system and heat exchanger module may then be situated within the accommodation space when in the operative position, and situated externally of the accommodation space when in the access position.

The fuel fired heater may be oil fired. For most practical purposes, the output of the heater should be sufficient to increase the temperature of water drawn from the water tank by between 40° C. and 65° C. at a flow rate of 12 to 16 liters per minute. A power output of the heater of approximately 30 kilowatts is adequate to provide 15 liters of water per minute at a temperature of 65° C. Different power outputs may be desirable for different delivery characteristics, for example a power output of between 20 and 45 kilowatts.

Ducting may be provided for conveying exhaust gases from the heater through a channel in the buffer tank to enable heat exchange between the hot exhaust gases and the water within the buffer tank.

The delivery device may be a spray gun for manual operation.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 2:
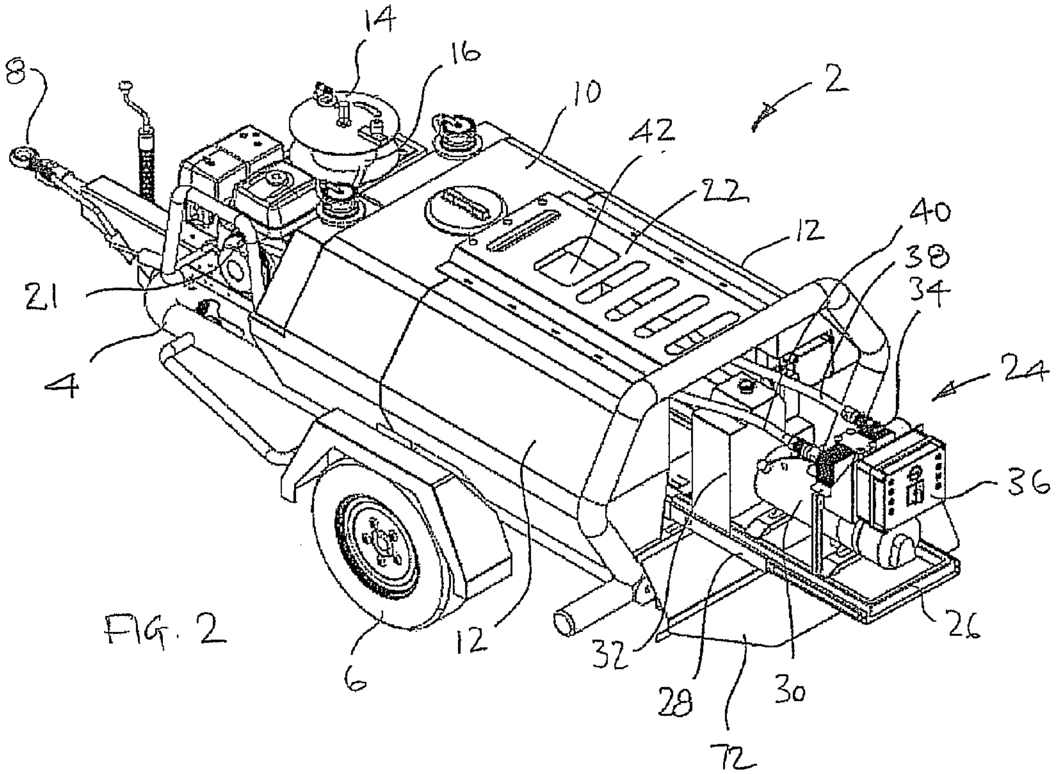
FIG. 2 is a perspective view of the mobile power washer.
Figure 3:
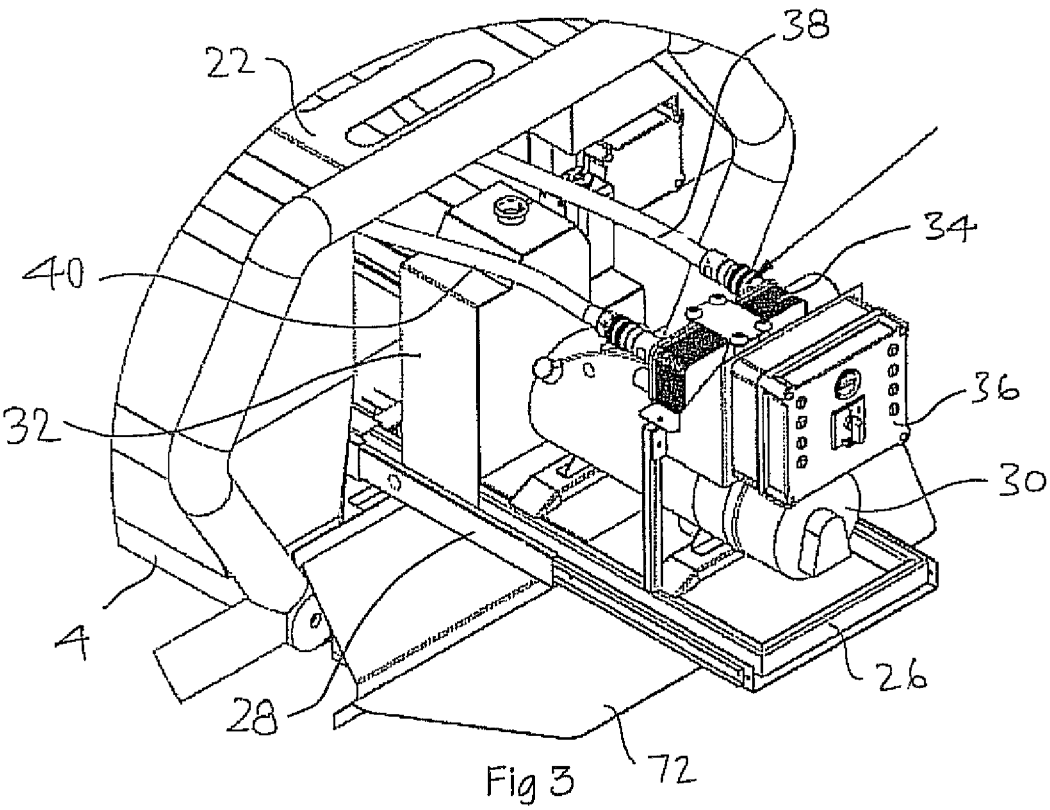
FIG. 3 is an enlarged view of part of the mobile power washer of FIG. 2.

Referring first to FIG. 2, a mobile power washer 2 comprises a main frame 4 provided with wheels 6 and a tow hitch 8 to form a trailer. A cold water tank arrangement is supported by the main frame 4, and comprises a front container or tank 10 (with respect to the normal travel direction of the trailer when towed by means of the hitch 8) and two side containers or tanks 12. Together, the tanks 10, 12 are capable of holding 800 liters of water, the front tank 10 having a capacity of 400 liters and the side tanks each having a capacity of 200 liters.

At the front end of the trailer, i.e. the end towards the hitch 8, there is a hose reel 14 which carries a hose 16 to which, in use, a delivery device in the form of a gun 18 (see FIG. 1) is connected. A high pressure pump 20 driven by a petrol or diesel engine 21 is mounted on the main frame 4.

The side tanks 12 are spaced apart from each other and define between them an accommodation space which is covered by a vented panel 22. A heater module 24 carried by a sub-frame 26 is mounted on the main frame 4 by means of sliding, telescoping rails 28 which enable the module 24 to be moved between an access position shown in FIG. 2 and an operative position shown in FIG. 4, in which the module 24 is situated in the accommodation space between the side tanks 12. The heater module 24 comprises an oil fired heater 30, a header tank 32, a heat exchanger 34 and a control panel and status indicator 36. Also visible in FIG. 2 are inlet and outlet hoses 38, 40 connected to the heat exchanger 34 by respective quick-connect couplings, and a buffer tank 42 which is situated within the accommodation space beneath the vented panel 22.

Figure 1:
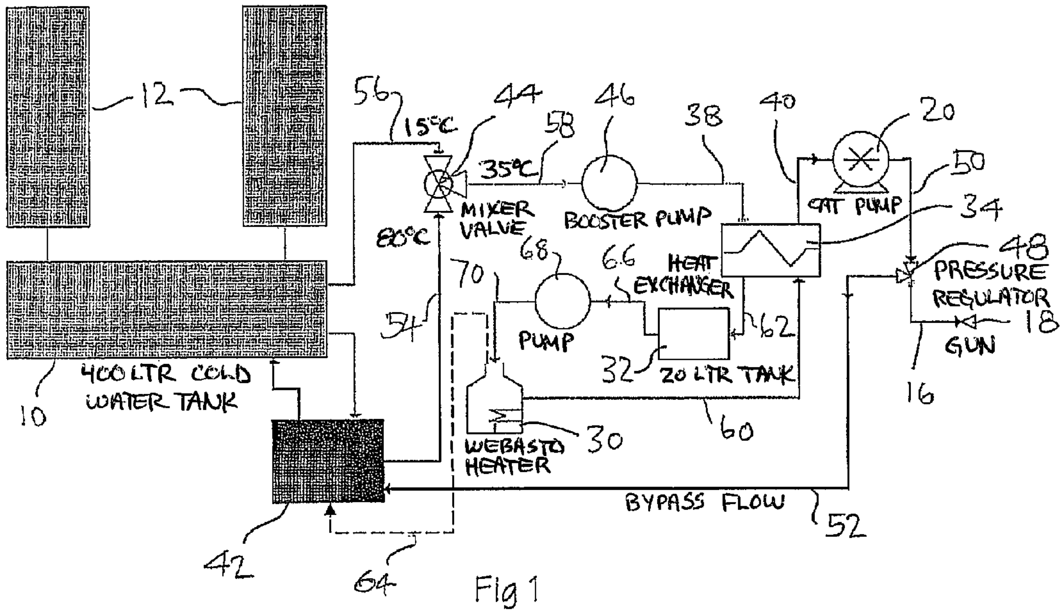
FIG. 1 is a schematic diagram of a water system and a heating system of a mobile power washer.

FIG. 1 represents connections between the components of the mobile power washer described with reference to FIG. 2, along with other components of the power washer. It will be appreciated that a water system of the power washer comprises the tanks 10, 12 which are formed separately from one another for ease of manufacture, but are interlinked so as to behave substantially as a single container. The tanks 10, 12 communicate with the spray gun 18 via a mixer valve 44, a booster pump 46, the heat exchanger 34, the high pressure pump 20 and a pressure regulator 48. The pressure regulator 48 has an inlet connected by a line 50 to the high pressure pump 20, and an outlet which is connected to the hose 16 on the spool 14. A relief outlet of the pressure regulator is connected by a line 52 to the buffer tank 42. The buffer tank 42 is linked to the tanks 10, 12 and so is filled under gravity when the tanks 10, 12 are filled. It is also open vented to the top of the tanks 10, 12. The buffer tank 42 is connected by a line 54 to an inlet of the mixer valve 44. Thus, the mixer valve has a first inlet connected by a line 56 to the water supply tanks 10, 12, a second inlet connected by the line 54 to the buffer tank 42, and an outlet connected by a line 58 to the booster pump 46. The booster pump 46 is connected by the hose 38 (see FIG. 2) to a water inlet of the heat exchanger 34, a water outlet of the heat exchanger 34 being connected by the hose 40 to the high pressure pump 20.

The heater circuit of the heater module 24 comprises the heater 30 which forms part of a circuit for working fluid comprising a line 60 connecting the hot fluid outlet of the heater 30 to the heat exchanger 34, a line 62 connecting the heat exchanger 34 to the header tank 32, a line 66 connecting the header tank 32 to a circulation pump 68, and a line 70 which connects the circulation pump 30 to the "cold" fluid inlet of the heater 30.

As indicted by a line 64, the hot exhaust from the heater 30 is ducted to the buffer tank 42 and is conveyed through a central channel to transfer heat from the exhaust gases to the water in the buffer tank 42.

The power washer also has a 24V battery pack (not shown) and an alternator (not shown) connected to a power take-off from the engine 21 or the high pressure pump 20.

The heater 30 may be capable of producing a 30-45 kilowatt power output. The heater 30 may be a Webasto diesel fired DBW 300 heater capable of producing a 30 kilowatt power output. The heater 30 requires a 24V DC power supply, which is provided by the alternator referred to above. The heat exchanger 34 may be a FlatPlate FP heat exchanger available from GEA FlatPlate, Inc. The working fluid of the heating circuit may be a 50:50 glycol:water mixture, which is pumped continuously through the heater 30 and the heat exchanger 34 and back to the header tank 32 when the heating system is in operation. The temperature of the working fluid in the heating circuit is controlled by an adjustable electronic thermostat.

When the heating system is not in operation, the mobile pressure washer 2 may be used as a cold water washer. Water is pumped from the cold water tanks 10, 12 through the mixer valve 44 by the pumps 46 and 20, through the pressure regulator 48 to the spray gun 18. With the heating system inoperative, no heat is transferred in the heat exchanger 34.

If the spray gun 18 is closed, the pumps 20 and 46 can continue to run, and water is relieved by the pressure regulator 48 to the line 52 and thence to the buffer tank 42, and thence to the cold water tanks 10, 12 or, via the line 54, to the mixer valve 44 for recycling through the circuit.

For hot water washing, the heater 30 is fired up, and the working fluid is heated and circulated through the heat exchanger 34 as described above. The electronic thermostat sets a maximum temperature of the working fluid at, for example, 86° C. If that temperature is reached, the heater 30 is switched off until the temperature of the working fluid falls again.

The booster pump 46 draws a mixture of cold water from the tanks 10, 12 and hot water from the buffer tank 42 through the mixer valve 44. In the early stage of operation the water in the buffer tank 42 will normally be cold. Consequently, while the mixer valve 44 is set up to mix water from the water supply tanks 10, 12 (at ambient temperature, for example 15° C.) and water from the buffer tank 42 (which may reach a temperature close to that of the maximum temperature of the working fluid in the heater circuit, such as 80° C.), the temperature of the water initially received from the mixer valve 44 will be below its normal working temperature, for example 35° C. The booster pump 46 supplies the water to the heat exchanger 34, where it is heated by thermal contact with the working fluid heated by the heater 30, and then supplied under high pressure by the pump 20 to the spray gun 18. During the warm-up phase, the spray gun 18 will not be activated, and so will remain closed. Consequently, the heated water will be directed by the pressure regulator 48 to the buffer tank 42. As the process continues, the temperature of the water in the buffer tank 42 will increase until the mixer valve 44 is able to deliver water at its operating temperature of 35° C., and the working fluid in the heater circuit is at a sufficient temperature to raise the water temperature in the heat exchanger 34 to a desired operating level for the spray gun 18. This temperature may, for example, be 75° C.

Typically, the mobile pressure washer described above is capable of delivering water at 238 bar and 75° C. at a flow rate of 12 l/min.

As mentioned above, the heater module 24 is situated within the accommodation space beneath the vented panel 22. In this condition, a rear panel 72 can be closed. The panel 72 includes a hinged transparent window 74, which provides access to the unit 36.

It will be appreciated that the buffer tank 42 serves as a reservoir for hot water which is drawn off to be mixed in the mixer valve 44 with cold water from the tanks 10, 12 to provide an inlet flow to the heat exchanger 34 at a temperature of, for example, 35° C. The heat exchanger is thus not called upon to heat the water from ambient (i.e. the temperature of the water in the tanks 10, 12) to the working temperature (for example 75° C.) in a single pass. This reduces the heating requirement and consequently size of both the heater 30 and the heat exchanger 34.

In addition to receiving hot water from the pressure regulator 48, the contents of the buffer tank 42 are also heated by the hot exhaust from the heater 30, which is ducted to the buffer tank 42 and conveyed through a central channel within the buffer tank 42.

Furthermore, when the gun 18 is closed, the heated water supplied by the high pressure pump 20 is returned to the buffer tank 42 until called for when the gun 18 is subsequently opened again for operation. Consequently, heat generated while the gun 18 is closed is not lost, but is retained in the system for later use.

The buffer tank 42 may include a spray bar (not shown) located inside the buffer tank 42 close to the bottom of the tank. The spray bar may for example comprise a 38 mm tube, sealed at both ends and provided with four 4 mm holes evenly spaced along the tube and facing parallel to the bottom of the tank. In operation, the spray bar agitates the water held in the buffer tank 42, mixing the water and evening out any temperature differences. Any back pressure created by the presence of the spray bar is minimal (approximately 20 bar) and thus does not adversely affect the operation of the bypass loop.

Figure 4:
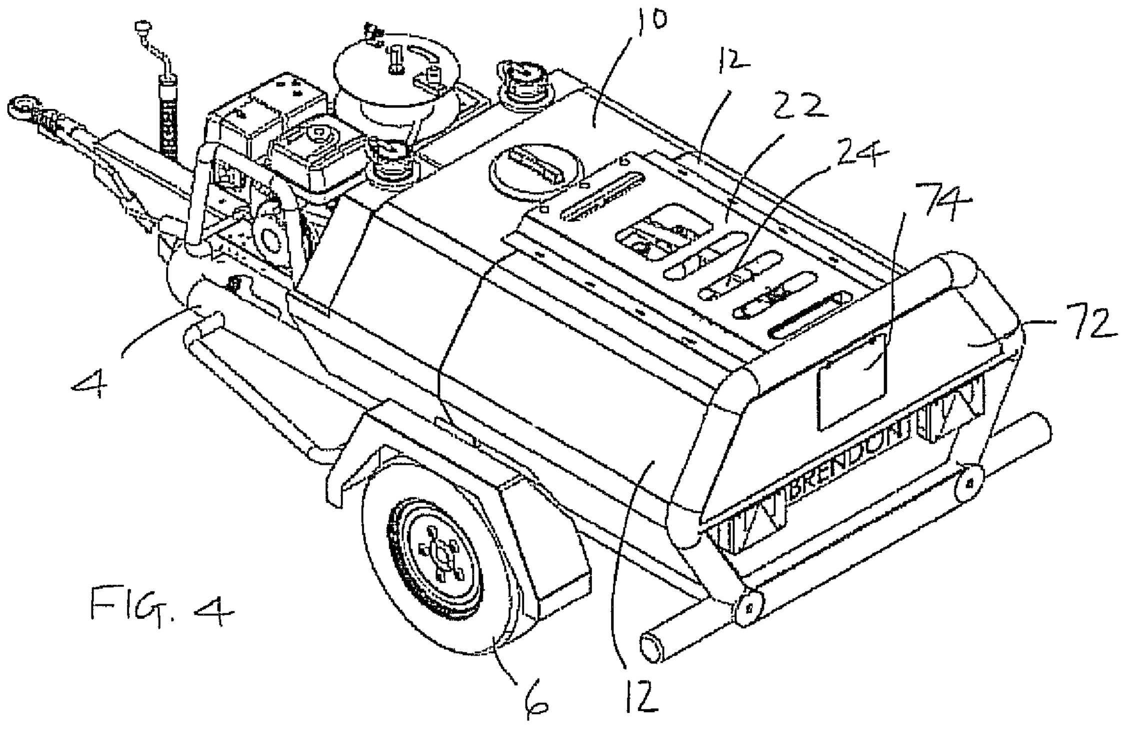
FIG. 4 corresponds to FIG. 2, but shows the mobile power washer in an alternative configuration.

For normal use and transportation, the heater module 24 is accommodated in the accommodation space between the tanks 12, as shown in FIG. 4. This provides a compact unit which can, for example, be towed by a relatively light vehicle such as a Sports Utility Vehicle (SUV) or the like. However, the heater module 24 can be accessed easily for servicing or replacement by sliding it out of the accommodation space on the rails 28. The module 24 can then be worked on in situ in the access position, outside the accommodation space. Alternatively, the hoses 38, 40 can be rapidly disconnected from the heat exchanger 34, and any electrical and fluid lines (for example a fuel line) can similarly be detached from the module 24 to enable it, with its sub-frame 26, to be removed from the trailer so that it can be serviced remotely, or replaced by another module 24.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A mobile power washer comprising:

a wheeled trailer carrying a water supply system including a water supply tank, a delivery device, and a pump that supplies water from the water supply tank to the delivery device, a heating system comprising a fluid circuit including a fuel fired heater for heating fluid in the fluid circuit, and a heat exchanger for providing heat exchange between heated fluid in the fluid circuit and water in the water supply system, wherein the water supply system includes a buffer tank connected to receive water from a first point in the water supply system situated downstream of the heat exchanger and the pump and upstream of the delivery device, and connected to deliver water to a second point in the water supply system situated between the water supply tank and the pump, and wherein a mixer valve is provided at the second point of the water supply system, the mixer valve having a first inlet connected to the water supply tank, a second inlet connected to the buffer tank, and an outlet connected to the delivery device via the heat exchanger and the pump.

2. A mobile power washer as claimed in claim 1, wherein the pump comprises a high pressure pump capable of delivering water at a pressure not less than 100 bar.

3. A mobile pressure washer as claimed in claim 2, wherein the heat exchanger has a water inlet and a water outlet, the water outlet of the heat exchanger being connected to the high pressure pump.

4. A mobile pressure washer as claimed in claim 2, wherein the pump further comprises a booster pump connected between the second point and the heat exchanger.

5. A mobile pressure washer as claimed in claim 1, wherein a pressure regulator is provided at the first point of the water supply system, the pressure regulator having an inlet connected to the pump, a delivery outlet connected to the delivery device, and a relief outlet connected to the buffer tank.

6. A mobile pressure washer as claimed in claim 1, wherein the mixer valve draws water selectively from its first and second inlets so as to provide water at its outlet at a designated operating temperature.

7. A mobile pressure washer as claimed in claim 1, wherein the buffer tank communicates with the water supply tank.

8. A mobile pressure washer as claimed in claim 1, wherein the heating system and the heat exchanger comprise a module which is mounted on a sub-frame supported on a main frame of the wheeled trailer by a sliding structure whereby the module is displaceable from an operative position to an access position.

9. A mobile pressure washer as claimed in claim 8, wherein the water supply tank comprises spaced containers which define an accommodation space, the module being disposed within the accommodation space when in the operative position.

10. A mobile pressure washer as claimed in claim 1, further comprising ducting for conveying exhaust gases from the heater through a channel in the buffer tank.

11. A mobile power washer comprising:

a wheeled trailer carrying a water supply system including a water supply tank, a delivery device, and a pump that supplies water from the water supply tank to the delivery device, a heating system comprising a fluid circuit including a fuel fired heater for heating fluid in the fluid circuit, and a heat exchanger for providing heat exchange between heated fluid in the fluid circuit and water in the water supply system, wherein the water supply system includes a buffer tank connected to receive water from a first point in the water supply system situated downstream of the heat exchanger and the pump and upstream of the delivery device, and connected to deliver water to a second point in the water supply system situated between the water supply tank and the pump, wherein the heating system and the heat exchanger comprise a module which is mounted on a sub-frame supported on a main frame of the wheeled trailer by a sliding structure whereby the module is displaceable from an operative position to an access position, and wherein the water supply tank comprises spaced containers which define an accommodation space, the module being disposed within the accommodation space when in the operative position.

12. A mobile power washer as claimed in claim 11, wherein the pump comprises a high pressure pump capable of delivering water at a pressure not less than 100 bar.

13. A mobile pressure washer as claimed in claim 12, wherein the heat exchanger has a water inlet and a water outlet, the water outlet of the heat exchanger being connected to the high pressure pump.

14. A mobile pressure washer as claimed in claim 12, wherein the pump further comprises a booster pump connected between the second point and the heat exchanger.

15. A mobile pressure washer as claimed in claim 11, wherein a pressure regulator is provided at the first point of the water supply system, the pressure regulator having an inlet connected to the pump, a delivery outlet connected to the delivery device, and a relief outlet connected to the buffer tank.

16. A mobile pressure washer as claimed in claim 11, wherein a mixer valve is provided at the second point of the water supply system, the mixer valve having a first inlet connected to the water supply tank, a second inlet connected to the buffer tank, and an outlet connected to the delivery device via the heat exchanger and the pump.

17. A mobile pressure washer as claimed in claim 16, wherein the mixer valve draws water selectively from its first and second inlets so as to provide water at its outlet at a designated operating temperature.

18. A mobile pressure washer as claimed in claim 11, wherein the buffer tank communicates with the water supply tank.

19. A mobile pressure washer as claimed in claim 11, further comprising ducting for conveying exhaust gases from the heater through a channel in the buffer tank.

* * * * *